(12) United States Patent
Benson et al.

(10) Patent No.: US 7,120,437 B2
(45) Date of Patent: Oct. 10, 2006

(54) METHOD AND APPARATUS FOR SELECTING CARRIERS

(75) Inventors: Maya Benson, Groundwell (GB); Howard Thomas, Groundwell (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/500,628

(22) PCT Filed: Jan. 27, 2003

(86) PCT No.: PCT/EP03/00788

§ 371 (c)(1),
(2), (4) Date: Jun. 30, 2004

(87) PCT Pub. No.: WO03/071824

PCT Pub. Date: Aug. 28, 2003

(65) Prior Publication Data

US 2005/0075074 A1    Apr. 7, 2005

(30) Foreign Application Priority Data

Feb. 21, 2002    (GB)    .................... 0204045.9

(51) Int. Cl.
*H04Q 7/20*    (2006.01)
(52) U.S. Cl. ................. 455/434; 455/67.11; 455/226.1; 455/168.1; 455/161.1
(58) Field of Classification Search ................ 455/434, 455/226.1, 67.11, 437, 161.3, 168.1
See application file for complete search history.

(56) References Cited

U.S. PATENT DOCUMENTS 5,327,575 A * 7/1994 Menich et al. ............... 455/437
5,857,153 A * 1/1999 Lupien ........................ 455/436
5,991,622 A   11/1999 Henry, Jr.
6,807,163 B1* 10/2004 Shi ............................. 370/337

FOREIGN PATENT DOCUMENTS

WO    WO-97/32445    *  9/1997
WO    WO 97/32445 A     9/1997

OTHER PUBLICATIONS

Universal Mobile Telecommunications System (UMTS);□□Radio Resource management strategies (3GPP TS 25.922 version 3.4.0 Release 1999)□□ETSI TS 125 922 V3.4.0(Dec. 2000).*

* cited by examiner

*Primary Examiner*—Lester G. Kincaid
*Assistant Examiner*—Dung Lam
(74) *Attorney, Agent, or Firm*—Steven A. May; Brian M. Mancini

(57) ABSTRACT

This invention relates to a method and apparatus for selecting carriers to be measured by a subscriber unit (301,303, 501). The subscriber unit (301, 303, 501) is served by a communication system and is operable to measure carriers in a frequency band, which typically belongs to a different communication system. The apparatus comprises a performance processor (329) for determining a measuring performance characteristic of the subscriber unit (301, 303, 501) related to the measurement performance of the subscriber unit (301, 303, 501) when measuring in the frequency band. The apparatus furthermore comprises a carrier subset selector (331) for selecting a subset of carriers in the frequency band to be measured by the subscriber unit. The subset of carriers is selected dependent on the measuring performance characteristic. The invention is applicable to dual 2nd and 3rd generation cellular communication systems such as GSM/UMTS.

31 Claims, 3 Drawing Sheets

-PRIOR ARTns
METHOD AND APPARATUS FOR SELECTING CARRIERS

This application is a 371 of PCT/EP03/00788 Jan. 27, 2003.

FIELD OF THE INVENTION

This invention relates to a method, apparatus and subscriber unit for selecting carriers to be measured by a subscriber unit served by a cellular communication system.

BACKGROUND OF THE INVENTION

In a cellular communication system, each of the subscriber units (typically mobile stations, communication terminals, wireless devices, user equipment, remote terminals etc) communicates with a fixed base station. Communication from the subscriber unit to the base station is known as uplink, and communication from the base station to the subscriber unit is known as downlink. The total coverage area of the system is divided into a number of separate areas or cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other geographical areas 109, 111 are covered by other base stations 113, 115. Some overlap areas 117 can be covered by more than one cell.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a subscriber unit is routed through the fixed network to the destination specific for this call. If the call is between two subscriber units of the same communication system, the call will be routed through the fixed network to the base station of the cell in which the other subscriber unit currently is. A connection is thus established between the two serving cells through the fixed network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

Traditional traffic in mobile cellular communication systems has been circuit switched voice data where a permanent link is set up between the communicating parties. In the future, it is envisaged that data communication will increase substantially and typically the requirements for a remote terminal to transmit data will not be continuous, but will be at irregular intervals. Consequently it is inefficient to have a continuous link set up between users. Instead a significant increase in packet based data traffic is expected, where the transmitting remote terminal seeks to transmit the data in discrete data packets when necessary. An example of a packet based system is the General Packet Radio Service (GPRS) introduced for the Global System for Mobile communication (GSM). Further details on data packet systems can be found in 'Understanding data communications: from fundamentals to networking, 2nd ed.', John Wiley publishers, author Gilbert Held, 1997, ISBN 0-471-96820-X.

A cellular mobile communication system is allocated a frequency spectrum for the radio communication between the subscriber units and the base stations. This spectrum must be shared between all subscriber units simultaneously using the system.

One method of sharing this spectrum is by a technique known as Time Division Multiple Access (TDMA). In a TDMA communication system, the frequency spectrum is typically divided into a number of separate frequency channels or carriers and for each of these carriers a plurality of subscriber units are served by being allocated distinct time intervals. Thus in the example of the TDMA communication system GSM, the frequency spectrum is divided into 200 kHz frequency channels each of which is divided into eight separate time slots. A subscriber unit is allocated a specific time slot on a given frequency channel for communication with the serving base station. Further details of GSM can be found in 'The GSM System for Mobile Communications', Bay Foreign Language Books, authors Michel Mouly and Marie-Bernadette Pautet, 1992, ISBN 2950719007.

Another method of sharing cellular spectrum is by a technique known as Code Division Multiple Access (CDMA). In a Direct Sequence CDMA (DS-CDMA) communication system, the signals are multiplied by a high rate code whereby the signal is spread over a larger frequency spectrum. A narrowband signal is thus spread and transmitted as a wideband signal. At the receiver, the original narrowband signal is regenerated by multiplication of the received signal with the same code used to spread the signal in the transmitter. A signal which has been spread by use of a different code will not be de-spread by the receiver but will remain a wide band signal. It will then be removed by filtering after the de-spreading operation. In the receiver, the majority of interference from signals in the same frequency spectrum as the wanted signal can thus be removed by filtering. Consequently, a plurality of subscriber units can be accommodated in the same wideband spectrum by allocating different codes for different subscriber units. Codes are chosen to minimise the interference caused between subscriber units typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 and the Universal Mobile Telecommunication System (UMTS).

Currently many cellular communication system operators are in the process of rolling out UMTS or other 3G communication systems. It is typically intended that these 3G systems will interoperate with the 2G communication systems such as GSM. Specifically, it is expected that UMTS communication systems will initially be rolled out in separate islands of coverage, and consequently most of the initial release mobiles will be dual mode UMTS/GSM mobiles, in order to enable use outside areas of UMTS coverage. Effective handover between UMTS and GSM is thus imperative when mobiles roam in and out of UMTS coverage.

UMTS and GSM standards are being written in a way to enable implementation of two types of multi-RAT (Radio Access Technology) mobiles, namely single receiver and dual receiver mobiles. Dual receiver mobiles can simultaneously receive both GSM and UMTS signals, so these mobiles can quickly perform measurements necessary for inter-system handover during active calls. However, single receiver mobiles can only measure other systems during idle periods, when the receiver of the subscriber unit is not active in receiving a call. In order to permit single receiver subscriber units to measure during an active UMTS call a compressed mode of operation has been standardised. In this method, the information of the active call is transmitted at increased data rate, thereby freeing up a time interval during which GSM measurements can be made. Single receiver mobiles in active GSM calls can perform UMTS measurements during GSM idle frames (the mobile synthesizer switching time does not allow UMTS measurements during idle GSM time slots). This results in long inter-RAT synchronisation times, e.g. a single receiver mobile in an active GSM call may require 1 second to synchronise to one UMTS cell under good channel conditions and 5–16 seconds under poor channel conditions. This is a highly unacceptable delay, which will result in decreased handover performance and an increased number of dropped calls.

Hence, the current schemes for measuring carriers result in unacceptable delays and degraded handover performance and there is thus a need for an improved system for measuring carriers.

SUMMARY OF THE INVENTION

The invention seeks to provide an improvement in the measuring of carriers in a frequency band by selecting carriers in response to a measuring performance characteristic of the subscriber unit.

Accordingly there is provided, a method of selecting carriers to be measured by a subscriber unit served by a cellular communication system and operable to measure carriers in a frequency band, the method comprising the steps of: determining a measuring performance characteristic of the subscriber unit related to the measurement performance of the subscriber unit when measuring carriers in the frequency band; and selecting a subset of carriers in the frequency band to be measured by the subscriber unit in response to the measuring performance characteristic.

By selecting a subset of carriers in the frequency band to be measured in response to a measuring performance characteristic of the subscriber unit, the number, order and priority of carriers can be optimised to meet the capability of the subscriber unit. Hence, for subscriber units having high measurement performance, demanding subsets of carriers can be chosen, whereas for subscriber units with low measurement performance, less demanding subsets of carriers can be chosen.

Preferably, the invention further comprises the steps of the subscriber unit measuring the carriers of the subset of carriers and determining a handover candidate carrier from the subset of carriers.

According to a feature of the invention, the measuring performance characteristic is indicative of the time required for the subscriber unit to measure carriers in the frequency band. Thus the measurement performance characteristic will directly relate to the capability of the subscriber unit to perform measurements within the time constraints imposed by the communication system.

According to another feature of the invention the measuring performance characteristic is indicative of the number of receivers in the subscriber unit. Thus the carriers selected will be chosen to reflect whether the subscriber unit has the ability to measure while receiving data communication or not, thereby enabling advantage to be taken of the ability of multiple receiver subscriber units, while not compromising the performance of single receiver subscriber units.

According to further features of the invention, the frequency band is a frequency band of a second communication system using different radio access technologies, preferably one communication system being a GSM communication system and the other a UMTS communication system. Hence, a fast and efficient method of performing cross system measurements optimised for the measurement capability of individual dual mode GSM and UMTS subscriber units is provided.

According to a second aspect of the invention, there is provided an apparatus for selecting carriers to be measured by a subscriber unit served by a cellular communication system and operable to measure carriers in a frequency band, the method comprising: means for determining a measuring performance characteristic of the subscriber unit related to the measurement performance of the subscriber unit when measuring carriers in the frequency band; and means for selecting a subset of carriers in the frequency band to be measured by the subscriber unit in response to the measuring performance characteristic.

According to a third aspect of the invention, there is provided a subscriber unit operable to be served by a cellular communication system and to measure carriers in a frequency band, the subscriber unit comprising: means for determining a measuring performance characteristic of the subscriber unit related to the measurement performance of the subscriber unit when measuring carriers in the frequency band; and means for selecting a subset of carriers in the frequency band to be measured by the subscriber unit in response to the measuring performance characteristic; and means for measuring the carriers of the subset of carriers.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The intention of most operators of $3^{rd}$ generation (3G) communication systems, such as UMTS, is to provide only limited coverage for 3G services. In order to compensate for the limited coverage, it is intended that existing $2^{nd}$ generation systems, such as GSM, will be used to provide coverage where there is no 3G coverage. This deployment strategy is known as island of coverage deployment and is illustrated in FIG. 2.

Figure 1:
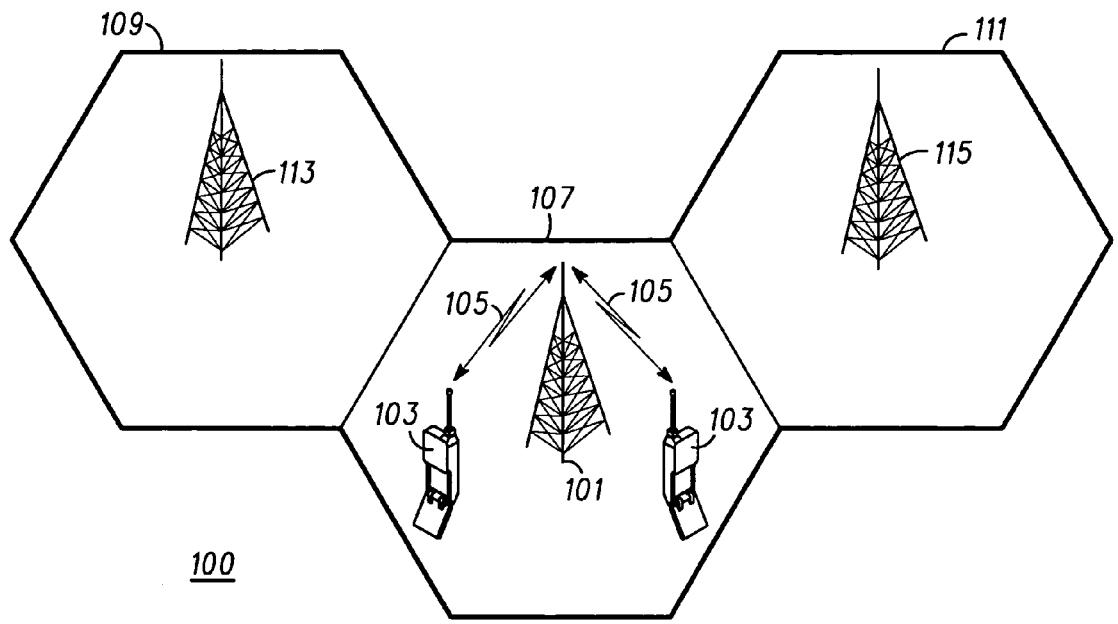
FIG. 1 is an illustration of a cellular communication system according to prior art.
Figure 2:
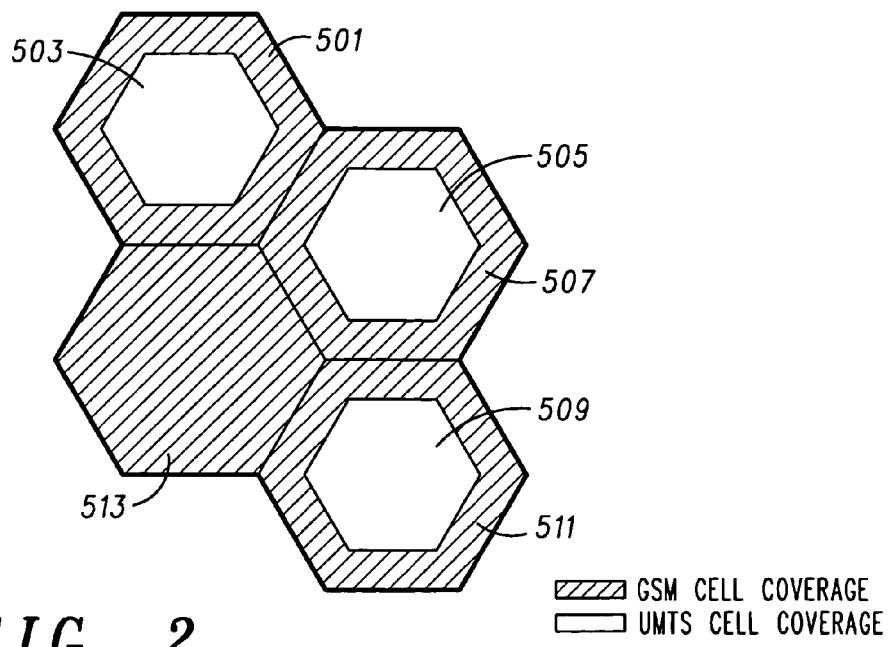
FIG. 2 is an illustration of an island of coverage deployment of a UMTS system.

As FIG. 2 shows, full coverage is provided by a number of GSM cells 501, 507, 511, 513. Within the coverage area of the GSM communication system, some areas are covered by a UMTS communication system by UMTS cells 503, 505, 509. In the example given, the UMTS base stations (node Bs) are co-located with the GSM base stations (BTSs) and do not overlap other UMTS cells. However in other deployment scenarios, UMTS cells may not be co-located with GSM cells and may be adjacent or over lapping. A subscriber unit located within a serving UMTS cell 503 can be provided with 3G services within this cell. However, as the subscriber unit moves across the border of the UMTS cell, it will be necessary to handover to another cell in order not to drop the call. As there are no UMTS cells available for handover, the subscriber unit will handover to a GSM cell 501, which in this case will become the GSM serving cell 501. Typically the GSM cell will not be able to provide the same services as the UMTS cell and therefore a change of service may be associated with the 3G to 2G handover, for example the data rate of the communication may be significantly reduced. As the subscriber unit moves into a different GSM cell 507, a 2G to 2G handover will be effectuated, so that cell 507 becomes the serving GSM cell. If the subscriber unit moves further into the GSM cell 507, it may enter the UMTS cell 505. At this point it will be desirable to hand over to the UMTS cell 505 in order to take advantage of the enhanced 3G services (such as for example the increased data rate of the initial UMTS cell 503).

Clearly it is preferable that 3G subscriber units are dual mode subscriber units having the capability to operate on both 2G and 3G communication systems. Further, it is important that handovers both from 2G to 3G and from 3G to 2G communication systems are efficient and speedy in order to maximise the network capacity and minimise the disruption to the user. Hence, intersystem handovers must be fast, accurate and reliable. In order to achieve efficient handovers, the subscriber unit must perform a number of measurements on the carriers of suitable handover candidates. Also the subscriber unit must be able to measure carriers of the other communication system in order to determine if handover is preferred to the current or to another communication system.

Figure 3:
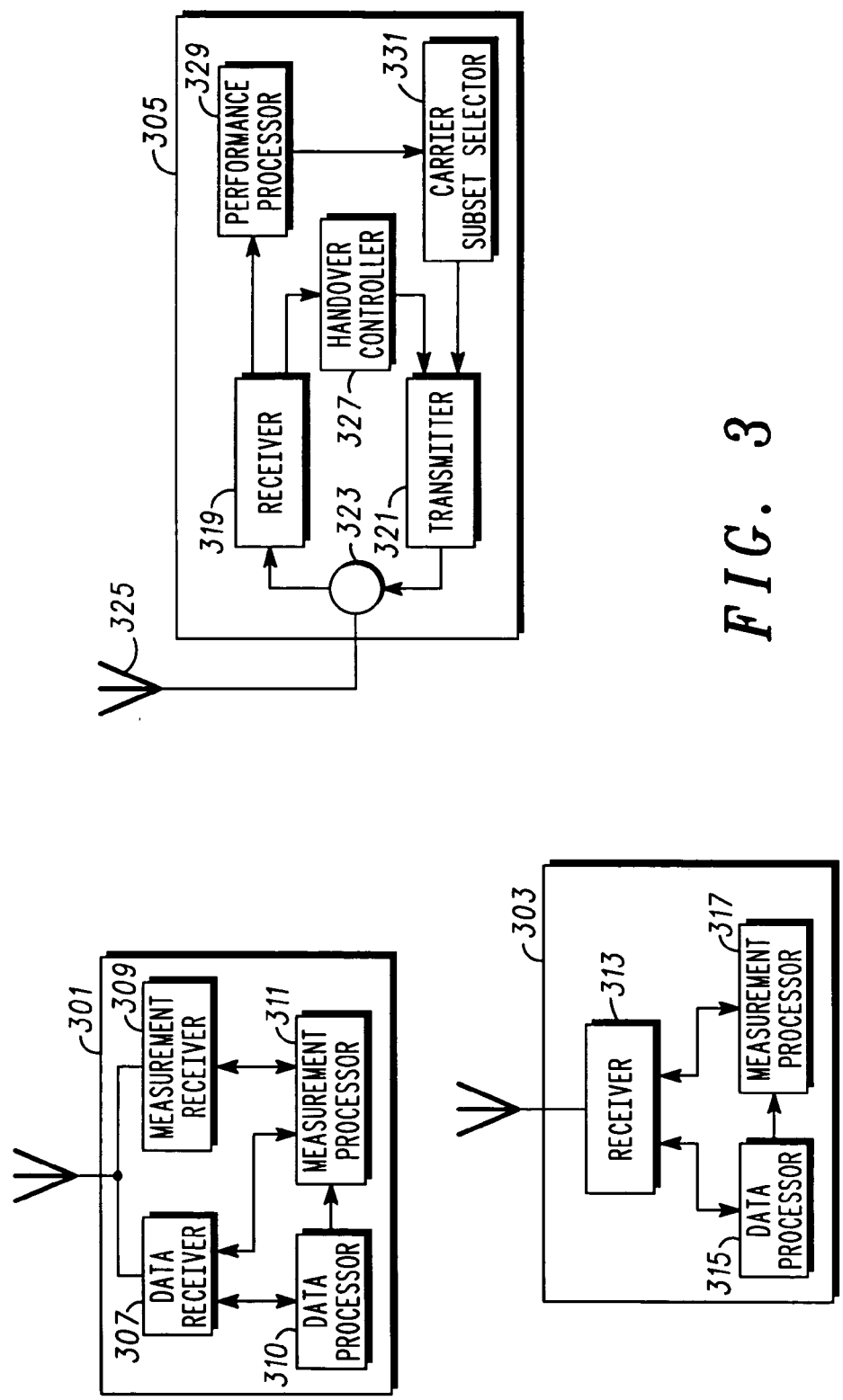
FIG. 3 is an illustration of a communication system in accordance with an embodiment of the invention.

FIG. 3 is an illustration of a communication system in accordance with an embodiment of the invention.

FIG. 3 illustrates a dual receiver subscriber unit 301, a single receiver subscriber unit 303 and a base station 305 representing the fixed network. For clarity only the aspects of the communication system necessary for the description of the embodiment are included in the figure. As is well known in the art, many other functions and circuits not specifically shown are required for a fully functioning communication system,.

In the embodiment of FIG. 3, both subscriber units 301, 303 are served by the base station 305. Both subscriber units 301, 303 are continuously measuring the carriers transmitted from other cells in order to determine if a better serving cell is available, in which case a handover process is initiated.

The dual receiver subscriber unit 301 comprises a data receiver 307 operable to receive and demodulate the communication signals transmitted from the base station 305. The receiver is coupled to a data processor 310, which processes the demodulated data signals as appropriate, for example by translating the received data into a speech signal provided to the user as is well known in the art. In addition, the dual receiver subscriber unit 301 comprises a second receiver which is a measurement receiver 309 operable to tune to the carriers of other base stations and perform measurements of these carriers. In its simplest form, the receiver simply measures the signal strength of other carriers but in more complex embodiments the measurement receiver may synchronise to the other cells and fully demodulate the signal in order to determine other parameters, such as a bit error rate or a frame error rate. The measurement receiver 309 is connected to the measurement processor 311, which has the dual function of processing the measurements and controlling the measurement receiver 309. The measurement processor 311 is in the preferred embodiment connected to a transmitter (not shown) of the dual receiver subscriber unit 301 in order to transmit measurement reports back to the base station 305.

The single receiver subscriber unit 303 comprises a single receiver, which is operable to perform the dual function of receiving the communication signal from the base station 305, as well as returning to perform measurements of carriers of other cells. Consequently, the receiver is connected to both a data processor 315 for processing the communication signal and a measurement processor 317 for processing the measurements and controlling the measurement function of the receiver. The measurement processor 317 is further connected to a transmitter (not shown) for transmitting a measurement report back to the base station. As the receiver of the single receiver subscriber unit 303 has a dual function, measurements of other cells can only be made when the receiver is idle i.e. when it is not engaged in receiving the communication signals from the base station 305.

The base station 305 comprises a receiver 319 and a transmitter 321 coupled to the same antenna 325 through a duplexer 323. The receiver 319 is operable to receive signals from the subscriber units 301,303 whether these comprise data traffic, control data or other information. Specifically, the receiver 319 receives control messages and measurement reports from the subscriber units 301,303. The receiver is connected to circuitry required for the further processing of data and control messages (not shown) as is well known in the art.

In addition, the receiver 319 is connected to a handover controller 327, which receives the measurements from the subscriber units and in response to these determines whether handover is required for each individual subscriber unit 301, 303. If handover is required it determines which target cell is the preferred handover candidate. In the simplest embodiment, a handover is executed when the quality of service (e.g. the bit error rate) increases above a given threshold, and the target cell is chosen as the cell reported having the highest signal level. However, many alternative handover algorithms are well known in the art and may be used in different embodiments.

The receiver 319 is further connected to a performance processor 329 operable to determine a measuring performance characteristic of the subscriber unit related to the measurement performance of the subscriber unit when measuring carriers in the frequency band.

The performance processor 329 is connected to a carrier subset selector 331 operable to select a subset of carriers to be measured by the subscriber unit. The carrier subset selector 331 selects the subset of carriers in response to the measuring performance characteristic determined by the performance processor 329.

Figure 4:
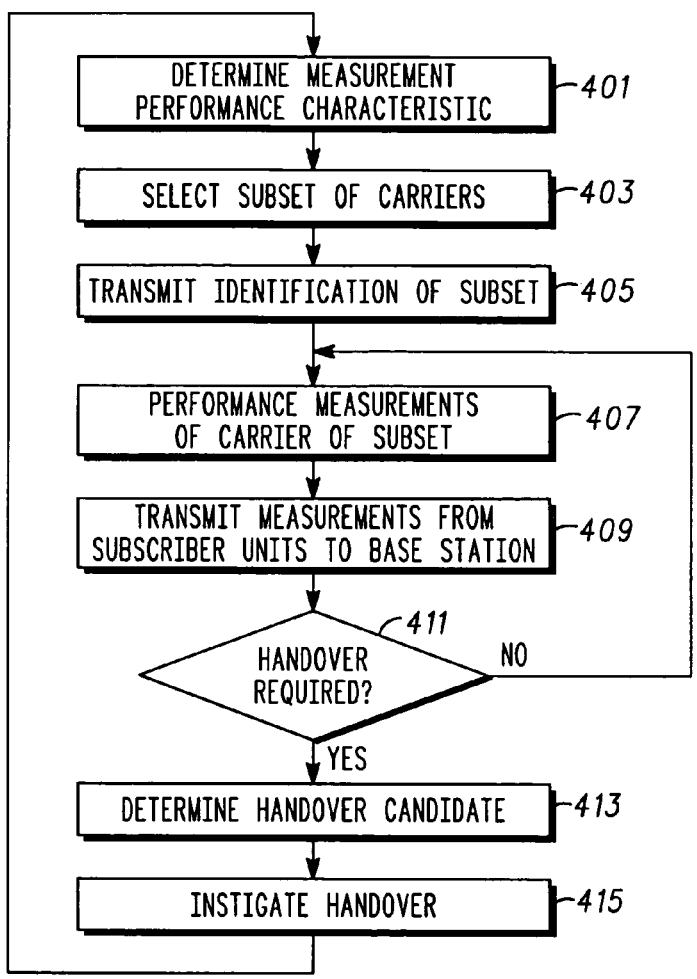
FIG. 4 is an illustration of a flow chart of a method of selecting carriers in accordance with an embodiment of the invention.

FIG. 4 is an illustration of a flow chart of a method of selecting carriers in accordance with an embodiment of the invention. The method is suitable for the communication system of FIG. 2.

In step 401, a measurement performance characteristic of the subscriber unit is determined. In the preferred embodiment this is determined in the fixed network, and in the specific example it is determined in the base station 305 by the performance processor 329.

In the preferred embodiment, the measurement performance characteristic relates to whether the subscriber unit is a single receiver subscriber unit 303 or a dual receiver subscriber unit 301. Thus the measurement performance characteristic relates to whether the subscriber unit has one or two receivers, and thus whether it can measure other cell carriers continuously or only during idle periods. In other embodiments, the measurement performance characteristic may relate to other characteristics of the measurement process or subscriber unit measurement capability, such as for example the possible accuracy of the measurements, the sensitivity of the measurement receiver, the speed at which measurements can be communicated to the network, the number of different carriers that can be measured, the extent of the frequency band which can be measured etc. Hence, the measurement performance characteristic may relate to any characteristic related to the measurement performance of the subscriber unit when measuring carriers.

In the preferred embodiment the measurement performance characteristic of a subscriber unit is determined from control messages reported by the subscriber unit and indicating the number of receivers it comprises.

Thus in the preferred embodiment of a dual GSM/UMTS communication system, the single/dual receiver capabilities of the subscriber unit can for GSM be obtained from the standardised UE CAPABILITY message reported as part of the UTRAN CLASSMARK CHANGE message, while in UMTS this is contained in the UE CAPABILIY INFORMATION message. The UE CAPABILITY message contains the MEASUREMENT CAPABILITY IE, which states whether uplink or downlink compressed mode is required for measurements from UMTS to GSM for different GSM bands. The base station can deduce that if downlink compressed mode is required for GSM measurements, the subscriber unit has a single receiver, while if downlink compressed mode is not required, the subscriber unit has a dual receiver. (Note that the information on uplink compressed mode should not be used, since even dual receiver subscriber units may require uplink compressed mode to perform measurements on the DCS1800 band, due to proximity of this band with the UMTS core frequency allocation).

In other embodiments, the measurement performance characteristic is determined directly from evaluation of the subscriber unit's performance when measuring. In one embodiment, it is measured how frequently measurement updates are received from a subscriber unit, and the measurement performance characteristic is chosen as the average time between receipt of measurement reports.

In one embodiment, the measurement performance characteristic is determined from the number of measurement reports received from the subscriber unit within a given time interval. Specifically for a dual GSM/UMTS communication system, the base station can determine the capability of the subscriber unit by observing how many neighbours are reported during GSM active mode—i.e. during normal call operation. This can be compared to the number reported during call set-up, where the subscriber unit is on an SDCCH channel and so has more time to take UMTS measurements. If a lower number of neighbours are reported in active mode than in call set-up mode, it indicates that the subscriber unit has a low capability for making measurements. This may be related to a single receiver implementation but may also relate to other reasons for low measurement performance (e.g., associated with the measurement prioritisation process in the subscriber unit, the service that the subscriber unit is using, the mode of attachment to the network (e.g. DCH, FACH, PCH etc), or a battery saving mode). This method therefore has the advantage of enabling a dynamic update of the measurement performance characteristic to be made thereby reflecting the current measurement performance of the subscriber unit.

In step 403, the determined measurement performance characteristic is fed to the carrier subset selector 331. The carrier subset selector 331 selects a subset of all the possible carriers for the subscriber unit to measure. Thus in the example of a subscriber unit operating on a UMTS communication system and measuring on a GSM communication system, a subset of all carrier frequencies within the frequency band occupied by the GSM communication system is chosen. In the preferred embodiment, the size of the subset is dependent on the measurement performance characteristic. Thus if the subscriber unit is determined as comprising a single receiver e.g. four carriers may be included in the subset, whereas if the subscriber unit is determined as having two receivers e.g. eight carriers may be included in the subset of carriers. The subset is chosen to comprise the carriers of the neighbour cells considered most likely to be suitable targets for handovers, for example by being reported as having been received with the highest signal level by the subscriber unit. Hence in the specific example, if the subscriber unit is a single receiver subscriber unit, the carriers of the four cells having the highest signal level are included in the subset. If the subscriber unit is a dual receiver subscriber unit, the carriers of the eight cells reported with the highest signal level are included in the subset.

In other embodiments, a more continuous selection of carriers for the subset can be employed. In the specific embodiment of the measurement performance characteristic being an average time between measurements, the number of carriers included in the subset may simply be inversely proportional to the time between measurements.

In the case of GSM carriers being measured, the selection of carriers is made by selecting the appropriate carrier frequencies to be measured. However, in other communication systems such as for example UMTS, different carriers may be at the same frequency but separated by other means. In this case carriers are selected as appropriate for the characteristics of that communication system. For example when measuring on a UMTS system, different carriers will typically use the same frequency spectrum but have different spreading codes. In this case, selection of carriers is achieved by selecting the appropriate spreading codes of the carriers to be measured.

In step 405, identification of the selected subset of carriers is fed to the transmitter 321 and transmitted to the appropriate subscriber unit. The identification may be by any suitable means, such as by identifying the specific frequency of each carrier, the spreading code of each carrier or any other method conveying the information of which carriers are included in the subset. Specifically, in the case of GSM and UMTS communication systems the identification of the subset may be communicated as a neighbour list. The neighbour list may contain cells from the same, from different or from a mixture of communication systems.

The relevant subscriber unit receives the identification of the subset from the base station 325, and in step 407, it proceeds to measure the carriers identified to the subscriber unit. Thus the identification message is received by the receiver 309 or 313 and decoded by the data processor 307, 315, which feeds the identification to the measurement processor 311, 317. The measurement processor subsequently instigates the measurement process. If the subscriber unit is a single receiver subscriber unit 303, it will, in the specific example given above, receive identification of four carriers that it will begin to measure. If the subscriber unit is a dual receiver subscriber unit 301, it will receive identification of eight carriers that it will begin to measure.

Once the measurement process is completed, the subscriber unit transmits a measurement report to the base station 305. The measurement report is fed to the handover controller 327, which in step 411 determines if a handover is required or desired. If so, the handover controller 327 proceeds to determine the target handover candidate in step 413 and otherwise the process continues at step 407. If handover is required the handover controller 327 instigates the handover in step 415 by transmitting a handover command to the subscriber unit. It will be clear that any known method or algorithm of determining a handover candidate or the requirement for a handover may be used without detracting from the invention.

FIG. 4 illustrates the preferred embodiment but it is within the contemplation of the invention that any suitable order, interaction or frequency of the different function steps can be used, including performing some function steps independently and/or in parallel with other function steps. For example, the determination of the measurement performance characteristic may be performed only once during manufacture of the subscriber unit, whenever the subscriber unit registers on a network, following a handover or when requested by the base station. Similarly, the selection of carriers in the subset may for example be performed continuously, following handovers or whenever a new call is initiated.

By treating subscriber units differently according to the measurement performance characteristic, improved network performance is achieved. Specifically, requesting too many measurements from receivers with low measurement performance will amongst other things lead to increased power consumption, increased delay in measurements, excessively high resource demand of the measurement process and less resource for user data communication. Conversely, subscriber units having better measurement performance may be able to handle many measurements and limiting the measurements taken will result in fewer carriers being measured leading to reduced information being gathered about the radio environment of the specific subscriber unit. If handovers are based on these measurements, an increase in sub optimal handovers and dropped calls will result, leading to reduced system capacity. However, by selecting carriers to be measured in accordance with the measurement performance of the subscriber unit, it is possible to optimise the measurement process for each individual subscriber unit in accordance with it's measurement capability, and thereby improve performance of the communication system(s).

Specifically for a combined UMTS/GSM system, requesting measurement on GSM too frequently from single receiver subscriber units will degrade the quality of service available to the user, the power consumption of the subscriber unit and the network capacity will be adversely affected. Conversely, if a similar level of measurements is requested from a dual receiver subscriber unit the only impact is to slightly reduce UE battery life.

Figure 5:
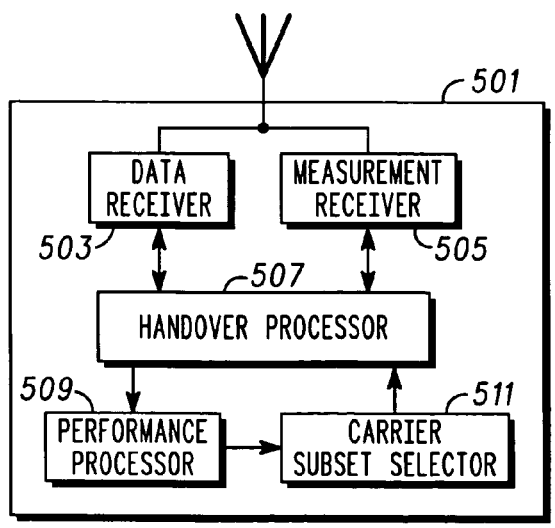
FIG. 5 is an illustration of a subscriber unit in accordance with an embodiment of the invention.

In another embodiment, the determination of the measurement performance characteristic and selection of the subset of carriers is performed independently by the subscriber unit. FIG. 5 illustrates a dual receiver subscriber unit in accordance with this embodiment of the invention.

The dual receiver subscriber unit 501 comprises a data receiver 503 operable to receive and demodulate the communication signals transmitted from the base station (not shown). The data receiver 503 is connected to a data processor (not shown) for processing the communication signal as is well known in the art. In addition, the shown subscriber unit 501 comprises an optional measurement receiver 505, whereas other subscriber units of the communication system do not comprise this measurement receiver 505. The measurement receiver 505 is operable to measure carriers in a frequency band. For subscriber units not comprising the optional measurement receiver 505, the data receiver 503 is operable to retune to measure carriers in the frequency band. Both the data receiver 503 and the measurement receiver 505 are coupled to a handover processor 507, which controls the handover functions of the subscriber unit. The handover processor is in turn connected to a performance processor 509 for determining a measuring performance characteristic of the subscriber unit related to the measurement performance of the subscriber unit, when measuring carriers in a frequency band. The performance processor 509 is connected to a carrier subset selector 511 operable to select a subset of carriers in the frequency band to be measured.

In this embodiment, the base station transmits a list of potential neighbours to all subscriber units. The data receiver 503 of the subscriber unit 501 receives the neighbour list and passes the information to the handover processor 507, which again feeds the information to the carrier subset selector 511. In addition, the handover processor 507 controls the performance processor 509 to determine a measurement characteristic of the subscriber unit. This characteristic is fed to the carrier subset selector 511, which in response to the measurement performance characteristic selects a subset of carriers from the neighbour list. Again, the neighbour list may contain cells from the same, a different or from a mixture of communication systems. Information of the selected subset is fed to the handover processor 507, which controls the measurement receiver to measure the selected carriers. If the subscriber unit 501 only comprises a single receiver 503, the handover processor 507 controls the data receiver 503 to measure the selected carriers during idle times of the receiver. Based on the measurements, the handover processor may determine if a handover is required and if so identify a target cell. In other embodiments, the handover processor 507 transmits the measurement report to the fixed network, and a handover processor in the fixed network determines handovers based on the measurements reports.

The performance processor 509 may simply determine the measurement performance characteristic as whether the receiver has one or two receivers. In this case, it may be implemented as simply as a permanent entry in a memory location of the subscriber unit, and thus the measurement performance characteristic may only be determined once during manufacture of the subscriber unit. Alternatively, the measurement performance characteristic can be determined continuously and reflect the dynamic chances of the measurement performance of the subscriber unit. In this case the performance processor 509 interacts with other circuitry of the subscriber unit to determine how efficient the measurement process currently is. The determination is preferably by determining the time delay or frequency of the measurements in the current condition or configuration of the subscriber unit. Alternatively, the measurement capabilities of the subscriber unit may be improved by it connecting with another device, such as another subscriber unit or and independent measuring device. Ea this embodiment, the measurement performance characteristic is dynamically updated as the subscriber unit connects and disconnects to external devices.

In the simple embodiment of the measurement performance characteristic simply relating to whether the subscriber unit has one or two receivers, the neighbour list passed to the carrier subset selector 511 can simply consist in a list of frequencies wherein some are intended to me measured in all circumstances and others are only to be measured if the subscriber unit comprises two receivers. Thus the neighbour list transmitted by the base station may have the following structure:

| Carrier Identity | Measurement Requirement |
|---|---|
| Carrier no. 45 | All receivers |
| Carrier no. 124 | Dual receiver subscriber unit only |
| Carrier no. 4 | All receivers |
| Carrier no. 53 | All receivers |
| Carrier no. 97 | Dual receiver subscriber unit only |
| Carrier no. 110 | Dual receiver subscriber unit only |
| Carrier no. 43 | All receivers |

In this example, a dual receiver subscriber unit will control the measurement receiver to measure carriers 45, 124, 4, 53, 97, 110, 43 and 97 whereas a single receiver will control the data receiver to measure carriers 45, 4, 53 and 43.

In this embodiment, the measurement requirements for each carrier is determined by the fixed network on a cell by cell basis dependent on the likelihood of a given carrier being the optimal handover candidate for subscriber units within the cell. Thus, the carriers of neighbour cells immediately adjacent the serving cell may be selected for all cells whereas more distant neighbour cells are only required to be measured by dual receiver subscriber units.

In more advanced embodiments a neighbour list provided does not relate directly to the measurement performance of the subscriber unit, but is ordered in terms of priorities of the carriers. Hence, in this embodiment the neighbour list transmitted by the base station may for example be as shown below:

| Carrier Identity | Priority |
|---|---|
| Carrier no. 45 | Highest |
| Carrier no. 124 | Highest |
| Carrier no. 4 | High |
| Carrier no. 53 | Medium |
| Carrier no. 97 | Medium |
| Carrier no. 110 | Low |
| Carrier no. 43 | Low |
| Carrier no. 97 | Low |

In this example, the carrier subset selector 511 selects carriers to be measured in order of their reported priority. Thus if the performance processor 509 determines that the subscriber unit is currently capable of measuring three carriers within a suitable time interval, carriers 45,124 and 4 are chosen for the subset. If the measurement performance characteristic currently indicates that six carriers can be measured, carrier no 45, 124, 4, 53, 97 and one of 110, 43 and 97 are chosen.

In a more sophisticated embodiment, the received neighbour list is simply a list of carriers ordered in terms of their relative priority (e.g. the likelihood of being the preferred handover candidate), and the subscriber unit determines the measurement performance characteristic as a specific number of carriers which can be measured and reported within the time constraints imposed by the system. In this embodiment, the carrier subset selector 511 simply chooses the specific number of carriers in order of their priority.

In yet another embodiment, the neighbour list transmitted from the base station does not comprise any information related to the measurement performance of the subscriber unit. Rather the subscriber unit in this embodiment occasionally measures all carriers of the neighbour list, and based on these occasional measurements the handover processor 507 orders the carriers of the neighbour list in order of measured signal strength. This ordered list is passed to the carrier subset selector 511, which selects the strongest carriers to be measured for handover determination. The number of carriers selected from the ordered list depends the measurement performance characteristic.

The above description has focused on embodiments wherein measurements are made for the purpose of determining handover candidates, but it is within the contemplation of the invention that it is suitable for any measurements benefiting from a selection of carriers in response to a measurement performance irregardless of the purpose or further use of these measurements.

The components and functionality described may be implemented in any suitable manner to provide suitable apparatus. Specifically, the components may consist of a single discrete entity, may be distributed over a plurality of entities and/or may be formed by adapting existing parts or components. As such the required adaptation may be implemented in the form of processor-implementable instructions stored on a storage medium such as floppy disk, compact disc, PROM, RAM or any combination of these or other storage media. Furthermore the functionality may be implemented in the form of hardware, software or any combination of these. As such it will be clear that the handover processor, performance processor and carrier subset selector of the preferred embodiment are shown as part of the base station or subscriber unit as an example only, and that these may be implemented in other elements of the network, such as in the Base Station Controller (BSC) for GSM and the Radio Network Controller (RNC) for UMTS.

It will be understood that the invention tends to provide a number of advantages including:

optimisation of a carrier measurement procedure for each individual subscriber unit dependent on the measurement performance of that subscriber unit.

allowing optimal trade off for each individual subscriber unit between measurement disadvantages and advantages.

specifically, for handover measurements, a trade off between the number of potential handover cells investigated and the speed of a handover can be optimised for each individual subscriber unit. This results in faster and more accurate handovers leading to improved quality of service and increased system capacity.

reduced power consumption of subscriber units by allowing measurements to dependent on the measurement performance.

The invention claimed is:

1. A method of selecting carriers to be measured by a subscriber unit served by a cellular communication system and having a number of receivers operable to measure carriers in a frequency band, the method comprising the steps of:

Dynamically determining a frequency of measurements updates when measuring carriers in the frequency band; wherein the frequency of measurements updates is indicative of the amount of time required by the subscriber unit to measure the carriers and wherein the amount of time required to measure the carriers is dependent on how many receivers a subscriber unit have; and Dynamically selecting a subset of carriers in the frequency band to be measured by the subscriber unit based on the frequency of measurement updates which is dependent on the frequency of measurement updates, which in turn is based on the number of receivers in a subscriber unit.

2. A method of selecting carriers as claimed in claim 1 further comprising the step of transmitting identification of the subset of carriers to the subscriber unit.

3. A method of selecting carriers as claimed in claim 1 further comprising the step of the subscriber unit measuring the carriers of the subset of carriers.

4. A method of selecting carriers as claimed in claim 1 wherein the frequency of measurement updates is indicative of the number of receivers in the subscriber unit.

5. A method of selecting carriers as claimed in claim 1 wherein the frequency band is a frequency band of a second communication system.

6. A method of selecting carriers as claimed in claim 1 wherein the cellular communication system and the second communication system use different radio access technologies.

7. A method of selecting carriers as claimed in claim 6 wherein the cellular communication system is a GSM communication system and the second communication system is a UMTS communication system.

8. A method of selecting carriers as claimed in claim 6 wherein the cellular communication system is a UMLTS communication system and the second communication system is a GSM communication system.

9. A method of selecting carriers as claimed in claim 6 wherein an update frequency capability of the subscriber unit is determined from a subscriber unit capability report indicating if compressed mode is required to perform measurements on a GSM communication system.

10. A method of selecting carriers as claimed in claim 1 wherein the size of the subset of carriers is dependent on an update frequency capability of the subscriber unit.

11. A method of selecting carriers as claimed in claim 1 wherein the subset of carriers is an ordered subset of carriers and the order of carriers in the subset of carriers is dependent on an update frequency capability of the subscriber unit.

12. A method of selecting carriers as claimed in claim 1 further comprising the step of determining a handover candidate carrier from the subset of carriers.

13. A method of selecting carriers as claimed in claim 1 wherein the frequency of measurement updates is determined from the number of measurement reports reported from the subscriber unit within a given time interval.

14. An apparatus for selecting carriers to be measured by a subscriber unit served by a cellular communication system and having a number of receivers operable to measure carriers in a frequency band, the method comprising the steps of:

Means for dynamically determining a frequency of measurements updates when measuring carriers in the frequency band; wherein the frequency of measurements updates is indicative of the amount of time required by the subscriber unit to measure the carriers and wherein the amount of time required to measure the carriers is dependent on how many receivers a subscriber unit have; and Means for dynamically selecting a subset of carriers in the frequency band to be measured by the subscriber unit based on the frequency of measurement updates which is dependent on the frequency of measurement updates, which in turn is based on the number of receivers in a subscriber unit.

15. An apparatus as claimed in claim 14 further comprising means for transmitting identification of the subset of carriers to the subscriber unit.

16. An apparatus as claimed in claim 14 wherein the frequency of measurement updates is indicative of the number of receivers in the subscriber unit.

17. An apparatus as claimed in claim 14 wherein the frequency band is a frequency band of a second communication system.

18. An apparatus as claimed in claim 17 wherein the cellular communication system and the second communication system use different radio access technologies.

19. An apparatus as claimed in claim 18 wherein the cellular communication system is a GSM communication system and the second communication system is a UMTS communication system.

20. An apparatus as claimed in claim 18 wherein the cellular communication system is a UMTS communication system and the second communication system is a GSM communication system.

21. An apparatus as claimed in claim 18 wherein the means for determining is operable to determine an update frequency capability of the subscriber unit from a subscriber unit capability report indicating if compressed mode is required to perform measurements on a GSM communication system.

22. An apparatus as claimed in claim 14 further comprising means for determining a handover candidate carrier from the subset of carriers.

23. An apparatus as claimed in claim 14 wherein the means for determining is operable to determine the frequency of measurement updates from the number of measurement reports reported from the subscriber unit within a given time interval.

24. A cellular communication system comprising the apparatus of claim 14.

25. A subscriber unit for selecting carriers to be measured by a subscriber unit served by a cellular communication system and having a number of receivers operable to measure carriers in a frequency band, the method comprising the steps of:

means for dynamically determining a frequency of measurements updates when measuring carriers in the frequency band; wherein the frequency of measurements updates is indicative of the amount of time required by the subscriber unit to measure the carriers and wherein the amount of time required to measure the carriers is dependent on how many receivers a subscriber unit have; and means for dynamically selecting a subset of carriers in the frequency band to be measured by the subscriber unit based on the frequency of measurement updates which is dependent on the frequency of measurement updates, which in turn is based on the number of receivers in a subscriber unit.

26. A subscriber unit as claimed in claim 25 wherein the frequency of measurement updates is indicative of the number of receivers in the subscriber unit.

27. A subscriber unit as claimed in claim 25 wherein the frequency band is a frequency band of a second communication system.

28. A subscriber unit as claimed in claim 25 wherein the cellular communication system and the second communication system use different radio access technologies.

29. A subscriber unit as claimed in claim 28 wherein the cellular communication system is a GSM communication system and the second communication system is a UMTS communication system.

30. A subscriber unit as claimed in claim 28 wherein the cellular communication system is a UMTS communication system and the second communication system is a GSM communication system.

31. A subscriber unit as claimed in claim 25 further comprising means for determining a handover candidate carrier from the subset of carriers.

* * * * *